(12) United States Patent
Johnson

(10) Patent No.: US 11,382,376 B1
(45) Date of Patent: Jul. 12, 2022

(54) LED SAFETY LIGHT FOR SNOWMOBILE HELMETS

(71) Applicant: Leonard William Johnson, Pagosa Springs, CO (US)

(72) Inventor: Leonard William Johnson, Pagosa Springs, CO (US)

(73) Assignee: LJE Products, Webster, NH (US)

( * ) Notice: Subject to any disclaimer, the term of this patent is extended or adjusted under 35 U.S.C. 154(b) by 0 days.

(21) Appl. No.: 17/592,826

(22) Filed: Feb. 4, 2022

(51) Int. Cl.
| | |
|---|---|
| *A42B 3/04* | (2006.01) |
| *F21V 33/00* | (2006.01) |
| *F21V 23/06* | (2006.01) |
| *A42B 3/24* | (2006.01) |
| *F21S 4/24* | (2016.01) |
| *F21Y 115/10* | (2016.01) |

(52) U.S. Cl.
CPC .............. *A42B 3/044* (2013.01); *A42B 3/245* (2013.01); *F21S 4/24* (2016.01); *F21V 23/06* (2013.01); *F21V 33/008* (2013.01); *B60Y 2200/252* (2013.01); *F21Y 2115/10* (2016.08)

(58) Field of Classification Search
CPC ..... A42B 3/044; A42B 3/0453; A42B 3/0433; F21S 4/24; F21V 23/06; F21V 33/008; F21Y 2115/10; B60Q 1/3676
See application file for complete search history.

(56) References Cited

U.S. PATENT DOCUMENTS

| | | | | |
|---|---|---|---|---|
| 5,544,027 | A * | 8/1996 | Orsano | A42B 3/044 362/800 |
| 2013/0104297 | A1* | 5/2013 | Silva | A42B 3/0453 2/422 |
| 2017/0215510 | A1* | 8/2017 | Demers | A42B 3/222 |
| 2018/0140034 | A1* | 5/2018 | Scott | F21V 15/012 |

FOREIGN PATENT DOCUMENTS

| | | | |
|---|---|---|---|
| AU | 2020100347 A4 * | 9/2020 | |
| FR | 3016114 A1 * | 7/2015 | ............ A42B 3/0453 |

* cited by examiner

*Primary Examiner* — Erin Kryukova
(74) *Attorney, Agent, or Firm* — Christopher Pilling

(57) ABSTRACT

A LED safety light for a snowmobile helmet is provided. The LED safety light includes a RCA male connector, a RCA female connector, and a LED light strip configured to attach to an outer surface of the snowmobile helmet. A double layered junction block includes an outer cover and an inner cover housing a PCB and at least a portion of the RCA female connector. The outer cover completely encapsulates the inner cover, wherein the junction block is configured to attach to the outer surface the snowmobile helmet. The RCA female connector is configured to be electrically connected to an auxiliary power output port of a snowmobile to provide power for the LED safety light and the RCA male connector is configured to electrically connect to a power input of a heated shield power input of the snowmobile helmet.

18 Claims, 3 Drawing Sheets

LED SAFETY LIGHT FOR SNOWMOBILE HELMETS

CROSS-REFERENCE TO RELATED APPLICATIONS

N/A

BACKGROUND OF THE INVENTION

1. Field of the Invention

The present invention generally relates to lighting equipment but more particularly to a LED safety light for a snowmobile helmet.

2. Description of Related Art

Snowy conditions often provide situations with low visibility. Snow conditions with poor light further reduce visibility. In the case of snowmobiling, snow dust added to these conditions can make for dangerous situations. The present invention provides a solution to this problem.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

In one aspect of the invention, a LED safety light for a snowmobile helmet is provided, comprising a power output electrical connector; a power input electrical connector; a LED light strip configured to attach to the snowmobile helmet; a junction block housing a PCB and at least a portion of the power input electrical connector, wherein the junction block is configured to attach to the snowmobile helmet; a first electrical conduit connected to the PCB and the power output electrical connector; a second electrical conduit connected to the PCB and the LED light strip; a third electrical conduit connected to the PCB and the power input electrical connector; and, wherein the power input electrical connector is configured to be electrically connected to an auxiliary power output port of a snowmobile to provide power for the LED safety light and the power output electrical connector is configured to electrically connect to a heated shield power input of the snowmobile helmet.

In one embodiment, the first electrical conduit, the second electrical conduit, and the third electrical conduit are insulated to withstand cold temperatures. In one embodiment, the junction block and the LED light strip are configured to attach to an outer surface of the snowmobile helmet via double sided adhesive tape. In another embodiment, the junction block comprises an outer cover; and, an inner cover, wherein the inner cover is configured to hold the PCB in position and the outer cover is configured to retain the inner cover and protect the inner cover and PCB from water, moisture, and cold temperature damage. In another embodiment, the outer cover is comprised of a front side and a back side, wherein the back side is shaped to match the contour of the snowmobile helmet. In yet another embodiment, the outer cover comprises plastic strain relief members for the first electrical conduit and the second electrical conduit. In one embodiment, the LED light strip comprises multiple rows of LED lights. In another embodiment, the LED light strip comprises a COB LED light strip. In one embodiment, the first electrical conduit is coiled enabling retraction and expansion for different sized helmets. In one embodiment, the power input electrical connector is configured to point approximately parallel to the ground surface when the junction box is attached to the snowmobile helmet. In one embodiment, the power output electrical connector is a male RCA connector. In one embodiment, the power input electrical connector is a female RCA connector.

In another aspect of the invention, a LED safety light for a snowmobile helmet is provided, comprising a RCA male connector; a RCA female connector; a LED light strip configured to attach to an outer surface of the snowmobile helmet; a double layered junction block having an inner cover housing a PCB and at least a portion of the RCA female connector and an outer cover completely encapsulating the inner cover, wherein the junction block is configured to attach to the outer surface the snowmobile helmet; a first electrical conduit connected to the PCB and the RCA male connector; a second electrical conduit connected to the PCB and the LED light strip; a third electrical conduit connected to the PCB and the RCA female connector; and, wherein the RCA female connector is configured to be electrically connected to an auxiliary power output port of a snowmobile to provide power for the LED safety light and the RCA male connector is configured to electrically connect to a power input of a heated shield power input of the snowmobile helmet.

In one embodiment, the outer cover is an overmolded plastic cover configured to prevent moisture and cold temperature damage. In one embodiment, the first electrical conduit, the second electrical conduit, and the third electrical conduit are thermally insulated to withstand cold temperatures. In one embodiment, the junction block and the LED light strip are configured to attach to the outer surface of the snowmobile helmet via double sided adhesive tape. In one embodiment, the LED light strip comprises two rows of LED lights. In one embodiment, the female RCA connector is configured to point approximately parallel to the ground surface when the junction box is attached to the outer surface snowmobile helmet.

The foregoing has outlined rather broadly the more pertinent and important features of the present disclosure so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present disclosure. It should be realized by those skilled in the art that such equivalent structures do not depart from the spirit and scope of the invention as set forth in the appended claims.

BRIEF DESCRIPTION OF THE SEVERAL VIEWS OF THE DRAWINGS

Other features and advantages of the present invention will become apparent when the following detailed description is read in conjunction with the accompanying drawings, in which.

DETAILED DESCRIPTION OF THE PREFERRED EMBODIMENT

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein to specifically provide a LED safety light for a snowmobile helmet.

It is to be understood that the terminology used herein is for the purpose of describing particular embodiments only and is not intended to be limiting. The terms "a" or "an," as used herein, are defined as to mean "at least one". The term "plurality," or "multiple" as used herein, is defined as two or more. The term "another," as used herein, is defined as at least a second or more. The terms "including" and/or "having," as used herein, are defined as comprising (i.e., open language). The term "coupled," as used herein, is defined as connected, although not necessarily directly, not necessarily mechanically, and not permanent. The term "providing" is defined herein in its broadest sense, e.g., bringing/coming into physical existence, making available, and/or supplying to someone or something, in whole or in multiple parts at once or over a period of time. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

Figure 1:
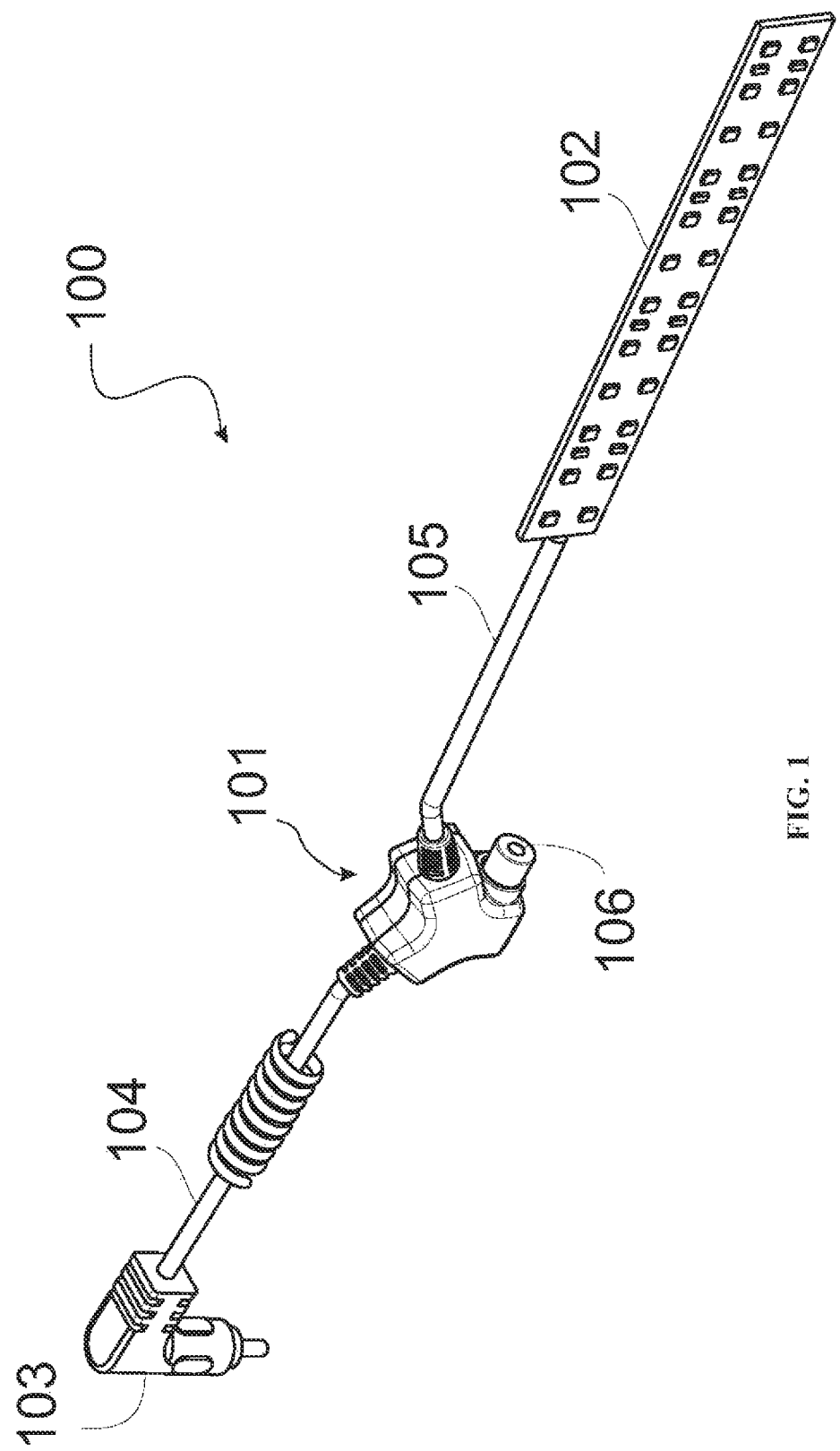
FIG. 1 is a perspective view of a LED safety light for a snowmobile helmet according to an embodiment of the present invention.

FIG. 1 is a perspective view of a LED safety light for a snowmobile helmet according to an embodiment of the present invention. Referring now to FIG. 1, the LED safety light 100 is illustrated. In one embodiment, the LED safety light 100 comprises a junction block 101, a LED strip 102, and a male RCA connector 103, wherein the male RCA connector 103 and the junction block 101 are electrically connected via a first electrical conduit 104 and the LED strip 102 and junction block 101 are electrically connected via a second electrical conduit 105. The electrical conduits are defined as a wire providing an electrical connection, which may be covered and insulated, such as a coaxial cable. As the environment of the present invention is for use in cold temperatures, the first and second electrical conduit 104 and 105 are constructed from cold resistant wire that is thermally insulated. The length of the first and/or second electrical conduit 104 and 105 may be adjustable (extended or retracted) via a coil or similar method. This allows the invention to be used on different sized snowmobile helmets.

In one embodiment, the junction block 101 includes a RCA female connector 106. In one embodiment, the RCA female connector 106 is configured to connect to the power source on the snowmobile, often the auxiliary power outlet, powered by the snowmobile as well known in the art. This gives power to the LED safety light, which is split to the LED strip 102 and the male RCA connector 103 as previously discussed. In one embodiment, the male RCA connector 103 is configured to be connected to a snowmobile helmet heated shield power input port, i.e. providing power to the snowmobile helmet heated shield. It should be understood, that although RCA connections are provided, any type of electrical connection may be used.

Figure 2:
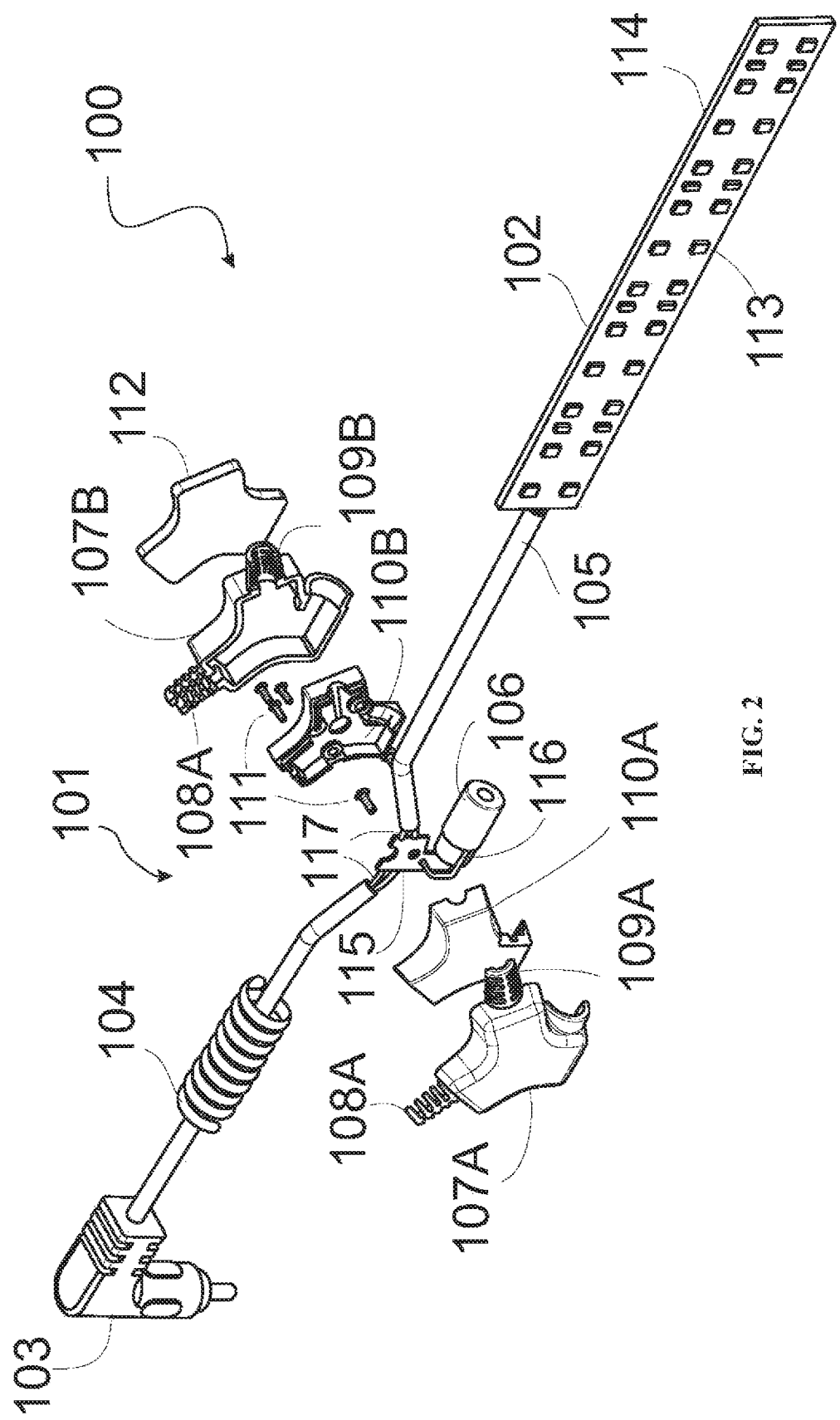
FIG. 2 is an exploded perspective view of the LED safety light for a snowmobile helmet of FIG. 1.

FIG. 2 is an exploded perspective view of the LED safety light 100 for a snowmobile helmet of FIG. 1. Referring now to FIG. 2, in one embodiment, the junction block 101 is comprised of a first outer cover 107A, a second outer cover 107B, a first inner cover 110A, a second inner cover 110B, and PCB (printed circuit board) 115. For the purposes of this disclosure, the junction block is considered the electrical connections of the PCB and the inner and outer covers. In one embodiment, the inner covers 110A/110B attach to form a single inner cover that protects and holds the PCB 115 in place, and covers at least a portion of the RCA female connector 106. The inner cover also protects soldered wires 117 defining the end terminal or portions of the electrical conduits 104 and 105. In some embodiments, the RCA female connector 106 is directly connected to the PCB or connected to the PCB via a third electrical conduit (illustrated as uninsulated wire 116 in FIG. 2). Yet, in some embodiments, the third electrical conduit is thermally insulated to withstand cold temperatures. Fastening hardware 111 attaches the PCB 115 to the first inner cover 110A and secures the first inner cover 110A to the second inner cover 110B. In one embodiment, a single screw is configured to attach the PCB 115 to the first inner cover 110A and three screws are configured to attach the first inner cover 110A to the second inner cover 110B. Next, the first outer cover 107A and the second outer cover 107B attach to each other via a fastening method, such as adhesive bonding, overmolding, or other known method etc. In one embodiment, the inner and outer covers are constructed from plastic. As well known in the art, the PCB provides and/or supports all the necessary electronic components to accommodate the electrical functionality of the LED safety light 100.

Advantageously, the outer cover 107A/B protects the inner cover 107A/B and PCB, wires, etc. from moisture, dust, water, i.e. the snowmobiling environment. In a preferred embodiment, the outer cover is overmolded plastic providing better protection in the snowmobiling environment than other methods. Further, the double layer combination of the outer cover 107A/B and the inner cover 107A/B ensures the PCB 115 and the soldered wires are protected from the environment. The double layer combination also strengthens the construction of the junction block 101 from pulling forces during use.

In one embodiment, the outer cover 107A/B comprises plastic strain relief members 108A/108B and 109A/109B for portions of the electrical conduits 104 and 105 respectively, wherein the plastic strain relief members prevent the electrical conduits from breaking near the connection points or end terminals. In one embodiment, the plastic is thermoplastic polyurethane (TPU); however other materials may be used. The outer surface of the second outer cover 107B is configured to attach to the outer surface of the snowmobile helmet. In one embodiment, a pliable doubled sided adhesive member 112 is used to attach the junction block 101 to an outer surface of the snowmobile helmet. As helmet shapes may be vary, the outer surface of the second outer cover 107B may be curved or flat to accommodate different helmet shapes and contours.

In one embodiment, the LED strip 102 comprises multiple rows of LED lights 113. In other embodiments, a single row of LED lights may be provided. In a preferred embodiment, two rows of LED lights are provided. In yet other embodiments, the LED strip is a COB (chip on board) LED light strip. It should be understood, as lighting technology improves, other lighting types may be provided. In one embodiment, a double sided adhesive tape 114 is provided to attach the LED strip 102 to the snowmobile helmet.

Figure 3:
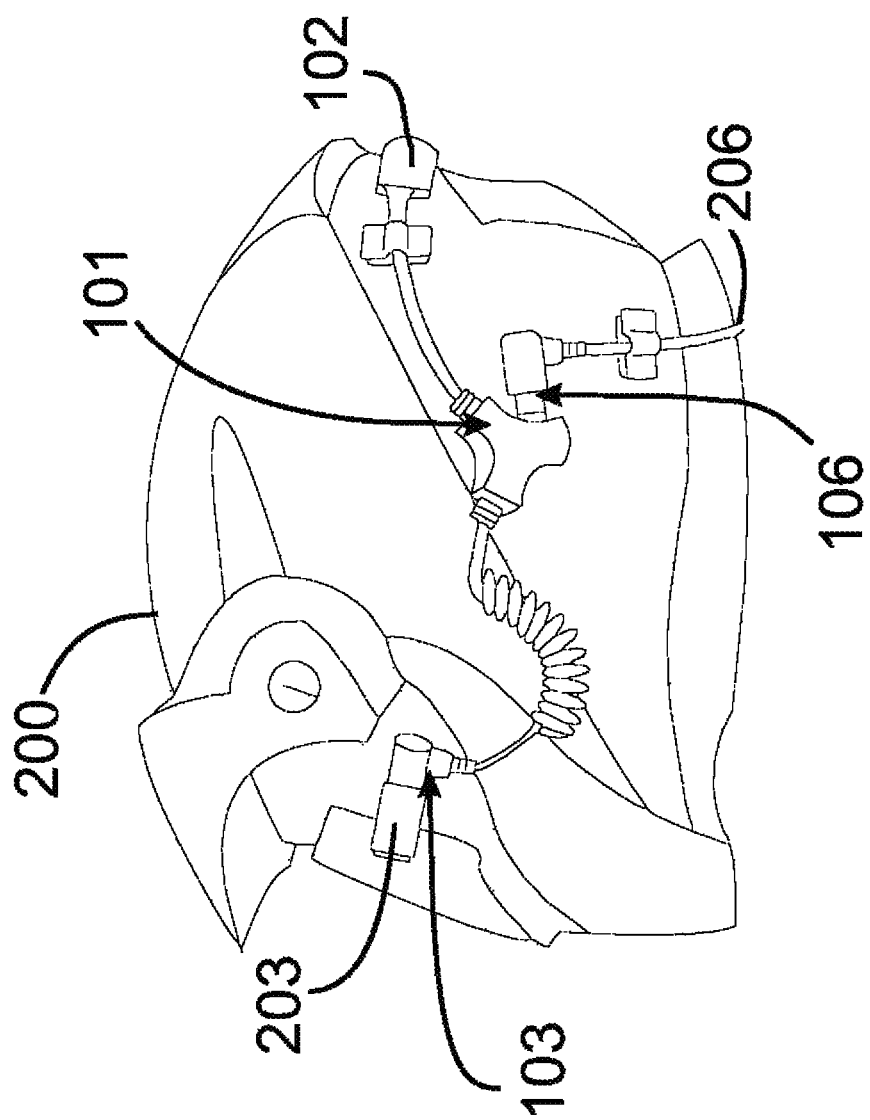
FIG. 3 is perspective view of the LED safety light installed on a snowmobile helmet according to an embodiment of the present invention.

Referring now to FIGS. 2-3, during use, first, a user secures the junction block 101 and the LED strip 102 to their snowmobile helmet 200 via double sided adhesives 112 and 114 respectively. It should be understood, that other attachment methods are possible, including brackets and other devices specifically designed to attach the junction block and LED strip to the snowmobile helmet. The junction block 101 should be installed such that when the user wears the snowmobile helmet (and their head is in a normal positon) the RCA female connector 106 is approximately parallel with the ground. This will be explained in further detail below. Next, the user can connect the male RCA connector 103 to their heated shield power input 203. Finally, using a separate RCA cable 206, the user can connect the present invention to the auxiliary power output port on their snowmobile (not illustrated) via the RCA female connector 106. This provides the invention with continuous power from the snowmobile, avoiding situations requiring charging, batteries, etc. The user may now heat their snowmobile helmet shield and emit bright safety lights simultaneously.

Traditional electrical connections to the auxiliary power of a snowmobile often get disconnected due to gravity or flexing from strong wind. In the present invention, the RCA female connector 106 is parallel to the electrical conduits as in their natural state (as illustrated), i.e. not flexed. Further, the RCA female connector 106 is configured to face backwards in relation to the front of the snowmobile helmet instead of downward avoiding the auxiliary power connection to discount due to gravity or flexing. More specifically, in one embodiment, the junction block is Y-shaped, wherein the first electrical conduit is provided on a left Y branch, and the second electrical conduit is provided on a right Y branch. The third electrical conduit (and RCA female connector) is perpendicular to the vertical component in the Y shape.

Although the invention has been described in considerable detail in language specific to structural features, it is to be understood that the invention defined in the appended claims is not necessarily limited to the specific features described. Rather, the specific features are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) are not used to show a serial or numerical limitation but instead are used to distinguish or identify the various members of the group.

What is claimed is:

1. A LED safety light for a snowmobile helmet comprising:
    a power output electrical connector;
    a power input electrical connector;
    a LED light strip configured to attach to the snowmobile helmet;
    a junction block housing a PCB and at least a portion of the power input electrical connector, wherein the junction block is configured to attach to the snowmobile helmet;
    a first electrical conduit connected to the PCB and the power output electrical connector;
    a second electrical conduit connected to the PCB and the LED light strip;
    a third electrical conduit connected to the PCB and the power input electrical connector; and,
    wherein the power input electrical connector is configured to be electrically connected to an auxiliary power output port of a snowmobile to provide power for the LED safety light and the power output electrical connector is configured to electrically connect to a heated shield power input of the snowmobile helmet.

2. The LED safety light for a snowmobile helmet of claim 1, wherein the first electrical conduit, the second electrical conduit, and the third electrical conduit are insulated to withstand cold temperatures.

3. The LED safety light for a snowmobile helmet of claim 2, wherein the first electrical conduit is coiled enabling retraction and expansion for different sized helmets.

4. The LED safety light for a snowmobile helmet of claim 1, wherein the junction block and the LED light strip are configured to attach to an outer surface of the snowmobile helmet via double sided adhesive tape.

5. The LED safety light for a snowmobile helmet of claim 1, wherein the junction block comprises:
    an outer cover; and,
    an inner cover, wherein the inner cover is configured to hold the PCB in position and the outer cover is configured to retain the inner cover and protect the inner cover and PCB from water, moisture, and cold temperature damage.

6. The LED safety light for a snowmobile helmet of claim 5, wherein the outer cover is comprised of a front side and a back side, wherein the back side is shaped to match the contour of the snowmobile helmet.

7. The LED safety light for a snowmobile helmet of claim 5, wherein the outer cover comprises plastic strain relief members for the first electrical conduit and the second electrical conduit.

8. The LED safety light for a snowmobile helmet of claim 1, wherein the LED light strip comprises multiple rows of LED lights.

9. The LED safety light for a snowmobile helmet of claim 1, wherein the LED light strip comprises a COB LED light strip.

10. The LED safety light for a snowmobile helmet of claim 1, wherein the power input electrical connector is configured to point approximately parallel to the ground surface when the junction box is attached to the snowmobile helmet.

11. The LED safety light for a snowmobile helmet of claim 1, wherein the power output electrical connector is a male RCA connector.

12. The LED safety light for a snowmobile helmet of claim 1, wherein the power input electrical connector is a female RCA connector.

13. A LED safety light for a snowmobile helmet comprising:
- a RCA male connector;
- a RCA female connector;
- a LED light strip configured to attach to an outer surface of the snowmobile helmet;
- a double layered junction block having an inner cover housing a PCB and at least a portion of the RCA female connector and an outer cover completely encapsulating the inner cover, wherein the junction block is configured to attach to the outer surface the snowmobile helmet;
- a first electrical conduit connected to the PCB and the RCA male connector;
- a second electrical conduit connected to the PCB and the LED light strip;
- a third electrical conduit connected to the PCB and the RCA female connector; and,
- wherein the RCA female connector is configured to be electrically connected to an auxiliary power output port of a snowmobile to provide power for the LED safety light and the RCA male connector is configured to electrically connect to a power input of a heated shield power input of the snowmobile helmet.

14. The LED safety light for a snowmobile helmet of claim 13, wherein the outer cover is an overmolded plastic cover configured to prevent moisture and cold temperature damage.

15. The LED safety light for a snowmobile helmet of claim 13, wherein the first electrical conduit, the second electrical conduit, and third electrical conduit are thermally insulated to withstand cold temperatures.

16. The LED safety light for a snowmobile helmet of claim 13, wherein the junction block and the LED light strip are configured to attach to the outer surface of the snowmobile helmet via double sided adhesive tape.

17. The LED safety light for a snowmobile helmet of claim 13, wherein the LED light strip comprises two rows of LED lights.

18. The LED safety light for a snowmobile helmet of claim 13, wherein the female RCA connector is configured to point approximately parallel to the ground surface when the junction box is attached to the outer surface snowmobile helmet.

* * * * *

UNITED STATES PATENT AND TRADEMARK OFFICE
CERTIFICATE OF CORRECTION

PATENT NO. : 11,382,376 B1
APPLICATION NO. : 17/592826
DATED : July 12, 2022
INVENTOR(S) : Leonard William Johnson It is certified that error appears in the above-identified patent and that said Letters Patent is hereby corrected as shown below:

On the Title Page

Item (71) Applicant should read: Leonard William Johnson, Webster, NH (US)

Item (72) Inventor should read: Leonard William Johnson, Webster, NH (US)

Signed and Sealed this
Twenty-eighth Day of May, 2024

Katherine Kelly Vidal
*Director of the United States Patent and Trademark Office*